United States Patent [19]
Schneider et al.

[11] Patent Number: 6,138,050
[45] Date of Patent: Oct. 24, 2000

[54] ANTENNA SYSTEM AND APPARATUS FOR RADIO-FREQUENCY WIRELESS KEYBOARD

[75] Inventors: Gerhard Schneider, Le Mont Sur Lausanne; Viron Teodoridis, Haute-Rive; Sergio Lazzarotto, Marin, all of Switzerland

[73] Assignee: Logitech, Inc., Fremont, Calif.

[21] Appl. No.: 08/932,753

[22] Filed: Sep. 17, 1997

[51] Int. Cl.⁷ ....................................... G05B 9/02
[52] U.S. Cl. .............. 700/84; 700/85; 700/86; 341/22; 343/702; 343/866
[58] Field of Search ................ 341/22, 26, 32; 343/702, 866; 400/479, 693; 710/3, 15, 18, 131; 700/83, 84, 85, 86

[56] References Cited

U.S. PATENT DOCUMENTS

| | | | |
|---|---|---|---|
| 4,860,292 | 8/1989 | Newman et al. | 371/32 |
| 5,138,328 | 8/1992 | Zibrik et al. | 343/702 |
| 5,365,230 | 11/1994 | Kikinis | 341/22 |
| 5,623,271 | 4/1997 | Ponnapalli | 343/895 |
| 5,677,698 | 10/1997 | Snowdon | 343/770 |
| 5,684,672 | 11/1997 | Karidis et al. | 361/683 |
| 5,708,458 | 1/1998 | Vrbanac | 345/156 |
| 5,787,259 | 7/1998 | Haroun et al. | 395/200.83 |
| 5,793,359 | 8/1998 | Ushikubo | 345/169 |
| 5,828,341 | 10/1998 | Delamater | 343/702 |
| 5,850,340 | 12/1998 | York | 364/188 |

FOREIGN PATENT DOCUMENTS

| | | |
|---|---|---|
| 0 604 338 A1 | 6/1994 | European Pat. Off. |
| 0 714 151 A1 | 5/1996 | European Pat. Off. |
| WO 85/00480 | 1/1985 | WIPO |
| WO 94/08361 | 4/1994 | WIPO |
| WO 94/28594 | 12/1994 | WIPO |

OTHER PUBLICATIONS

Itakura, H. and Tsunekawa, K., "Analytical Study of a Planer Loop Antenna With U–shape Notch," IEEE, XP 000588504, pp. 1140–1143, Jun. 18, 1995.

*Primary Examiner*—Paul P. Gordon
*Assistant Examiner*—Ramesh Patel
*Attorney, Agent, or Firm*—Fenwick & West LLP

[57] ABSTRACT

An antenna system for a radio frequency ("RF") wireless keyboard includes a metallic plate as a part of the antenna system. The metallic plate is located within the wireless keyboard. A RF transmitter is coupled to the metallic plate and an antenna wire which form an the antenna loop. The antenna loop may also be directly integrated into the metallic plate by creating a cut-out space in the metallic plate. The antenna system may also include the metallic plate directly coupled with the RF transmitter so that the metallic plate is a whip or dipole antenna. The RF transmitter generates RF signals associated with particular keyswitches of the wireless keyboard. The antenna system transmits the generated RF signals to a RF receiver that resides separately from, and that communicates with, the wireless keyboard.

20 Claims, 7 Drawing Sheets

ANTENNA SYSTEM AND APPARATUS FOR RADIO-FREQUENCY WIRELESS KEYBOARD

BACKGROUND OF THE INVENTION

1. Field of the Invention

The present invention relates to wireless keyboards for use in a data processing system and, more specifically, to antenna systems for wireless keyboards for use in a data processing system.

2. Description of the Related Art

Wireless keyboards for use with personal computers are known. Specifically, wireless infrared keyboards for use with personal computers are known. An infrared wireless keyboard simply uses an infrared transmitter in the keyboard and an infrared receiver in a personal computer to establish an input link from the keyboard to the personal computer. The wireless infrared keyboard does not, of course, need a physical wire connection between the keyboard and the personal computer so that there is no wire clutter.

The infra-red wireless keyboard, however, has numerous drawbacks. Specifically, the infrared wireless keyboard requires a clear line-of-sight between the infrared transmitter in the keyboard and the infra-red receiver in the personal computer. Moreover, the distance between the infrared keyboard and the personal computer must not be too great so that the infrared receiver in the personal computer cannot detect the infrared beam from the infrared transmitter of the wireless keyboard.

The clear line-of-sight and distance requirements constrain the flexibility a that user would desire with regard to a wireless device because an artificial limit is placed on the location and the distance that can exist between the infrared wireless keyboard and the personal computer. In addition, the infrared wireless keyboard has large power consumption requirements because of the infrared transmitter. The infrared wireless keyboard typically operates on a six-volt power source that is commonly derived from four 1.5-volt batteries. Moreover, the increased power consumption reduces overall battery life so that the batteries must be replaced more often.

Conventional radio-frequency ("RF") wireless keyboards addressed some of the shortcomings of the infrared wireless keyboards. Conventional RF wireless keyboards required less power than infrared wireless keyboard, and therefore, provided greater overall battery life so that batteries were replaced less often.

Conventional RF wireless keyboards have drawbacks. One drawback is that the requirement of an RF antenna being large enough so that it is efficient in transmitting RF signals. For example, a conventional RF antenna using electromagnetic propagation principles has a RF antenna that is of the same order of size as the RF wavelength. For example, a 27 MHz signal has a wavelength of eleven meters and would require an antenna of approximately three to six meters for signal transmission. Such a large RF antenna, however, is incompatible with devices such as the wireless keyboard that must be small enough to remain convenient and handy.

To accommodate the requirement of a large antenna without frustrating the advantages of the convenience and handiness of a wireless keyboard, complex and expensive antenna circuitry is incorporated into the conventional RF wireless keyboard. Such circuitry, however, increase the production costs associated with the conventional RF wireless keyboard. Further, the complex and expensive circuitry also increases the power consumption by the system, and therefore, reduces the battery life so that the batteries are replaced more often. Moreover, in some instances even the complex and expensive antenna circuitry still lacks the efficiency for transmitting RF signals that a large RF antenna provided.

Therefore, there is a need for an antenna system for a wireless keyboard that (1) has operational flexibility without physical restraints on communication between the wireless keyboard and a personal computer, (2) is inexpensive to operate and produce without complex and expensive added circuitry, (3) is compact enough to reside within a small housing, (4) consumes less power, and (5) is relatively easy to realize.

SUMMARY OF THE INVENTION

The present invention includes a low-cost, efficient, compact antenna system for use in a wireless keyboard. The wireless keyboard includes a housing and keys. The antenna system includes a radio-frequency antenna for use in a radio-frequency wireless keyboard. The radio frequency ("RF") antenna remotely couples the wireless keyboard to a personal computer or other device capable of receiving input from a keyboard.

The antenna system of the radio-frequency wireless keyboard includes an antenna wire having a first end and a second end, an RF printed circuit board that includes a digital processing circuit and a RF transmitter circuit, and a metallic plate having a first end and a second end within the wireless keyboard. In one embodiment, the printed circuit board may include a ground portion. The antenna system resides within the housing of the wireless keyboard.

The first end of the metallic plate is coupled to the an output of the RF transmitter circuit, which in one embodiment may be coupled to the ground portion. The second end of the metallic plate is coupled to the first end of the antenna wire. The second end of the antenna wire is coupled to another output of the RF transmitter circuit. Thus, the structure of the present invention forms an antenna loop that includes the antenna wire and the metallic plate as a component of the antenna loop. The antenna loop is used to generate a magnetic field from which RF signals are transmitted in accordance with electromagnetic propagation principles.

The RF printed circuit board includes a digital processing circuit and a RF transmitter for the radio frequency wireless keyboard. The metallic plate within the keyboard may be a metallic plate that is preexistent within a housing of a conventional keyboard. The metallic plate in the keyboard protects against electrostatic discharge. The metallic plate also creates a more rigid keyboard structure and adds some weight to the keyboard to generate a feeling of quality and durability with a user.

The antenna loop of the present invention has a length approximately equal to the length of the keyboard and a width that is as large as the remaining free space (height, length, and/or width)within the keyboard. Moreover, the antenna system is designed so that the entire antenna loop may be located within the housing of a conventional keyboard.

In an alternative embodiment, the RF antenna of the antenna system may be comprised of the metallic plate. For example, in one embodiment the antenna wire may be substituted with a cut-out of the metallic plate. The antenna system includes a metallic plate with a first portion and a second portion and a cut-out space in-between. The first portion is coupled to an output of the RF transmitter circuit and the second portion may be coupled to another output of the RF transmitter circuit or a ground. An antenna loop is formed by the first and the second portions and the length of the antenna loop is the length of the keyboard while the width of the antenna is as large as the remaining free space (height, length, and/or width) of the keyboard. Again, the antenna loop is used to generate a magnetic field from which the RF signals are transmitted.

In another embodiment of the present invention, the RF transmitter may be directly coupled to the metallic plate without having a ground connection. The antenna system is comprised of the metallic plate. The metallic plate operates as a whip or dipole antenna that is used to generate an electric field from which RF signals are transmitted in accordance with electromagnetic propagation principles.

The present invention advantageously uses the metallic plate preexisting in many conventional keyboards as a part of the antenna system to increase the radiation efficiency of the antenna. Further, the present invention illustrates this increase in efficiency by providing good radiation characteristics in both horizontal polarization and vertical polarization. The increased efficiency of the present invention beneficially provides a wireless keyboard that consumes less power than conventional wireless keyboards. In one embodiment, the antenna system and apparatus uses only a 3.0 volt power supply, such as that provided by two 1.5-volt batteries, for example.

In addition to the increased efficiency and reduced power consumption, the present invention is also advantageously compact so that it can reside within the housing of the wireless keyboard. The present invention also provides for easy connection to the printed circuit board that includes the radio-frequency transmitter.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

A preferred embodiment of the present invention will be described with reference to the Figures, where like reference numbers indicate identical or functionally similar elements. The present invention includes a low-cost, efficient, compact antenna system for use in a wireless keyboard device. The antenna system includes a radio-frequency ("RF") antenna system.

Figure 1:
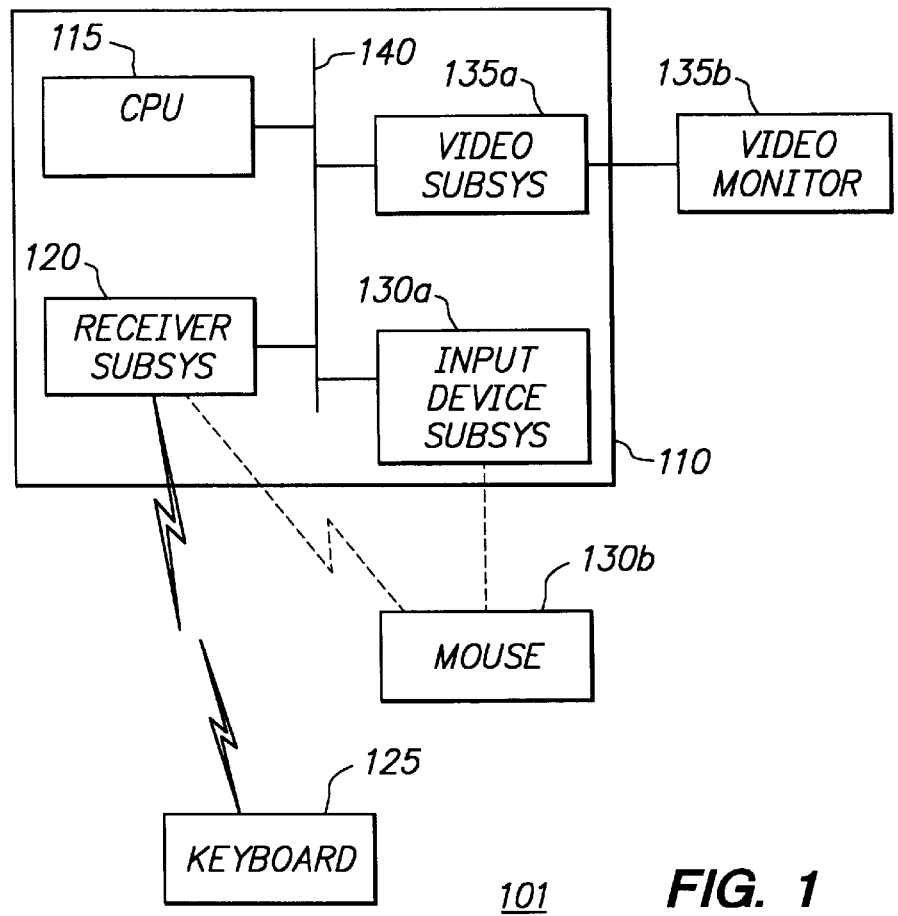
FIG. 1 is a block diagram of a data processing system including a wireless keyboard in accordance with the present invention.

FIG. 1 illustrates a data processing system 101 in accordance with the present invention. The data processing system 101 includes a processor system 110 having a central processing unit ("CPU") 115, a radio-frequency ("RF") receiver subsystem 120, an input device subsystem 130a, a video subsystem 135a, and a data bus 140. The CPU 115, the receiver subsystem 120, the input device subsystem 130a, and the video subsystem 135a are all coupled to the data bus 140.

In addition, the data processing system 101 includes a mouse 130b, a video monitor 135b and an RF wireless keyboard 125. The input device subsystem is coupled with an input device, for example the mouse 130b. The video subsystem 135a is coupled to a video system, for example the video monitor 135b. The RF receiver subsystem 120 is coupled to an RF input device, for example the wireless keyboard 125.

The RF receiver subsystem 120 may be a mono receiver or may be a multiple receiver. That is, the RF receiver subsystem 120 may be coupled via RF with the wireless keyboard alone or with the wireless keyboard and other RF transmitting devices, for example a RF wireless mouse. It is noted that in an alternative embodiment the RF receiver subsystem 120 maybe a standalone-type device that may be coupled to, but is located external to, the processor system 110.

During operation of the data processing system 101, the wireless keyboard 125 transfers RF signals representing particular keys of the keyboard to the processing system 110, and more specifically, to the RF receiver system 120. The RF receiver system 120 converts the RF signal to the appropriate key character and passes the key character to the CPU 115 for processing. The CPU 115 may forward the key character to the display unit 135 for display.

Figure 2:
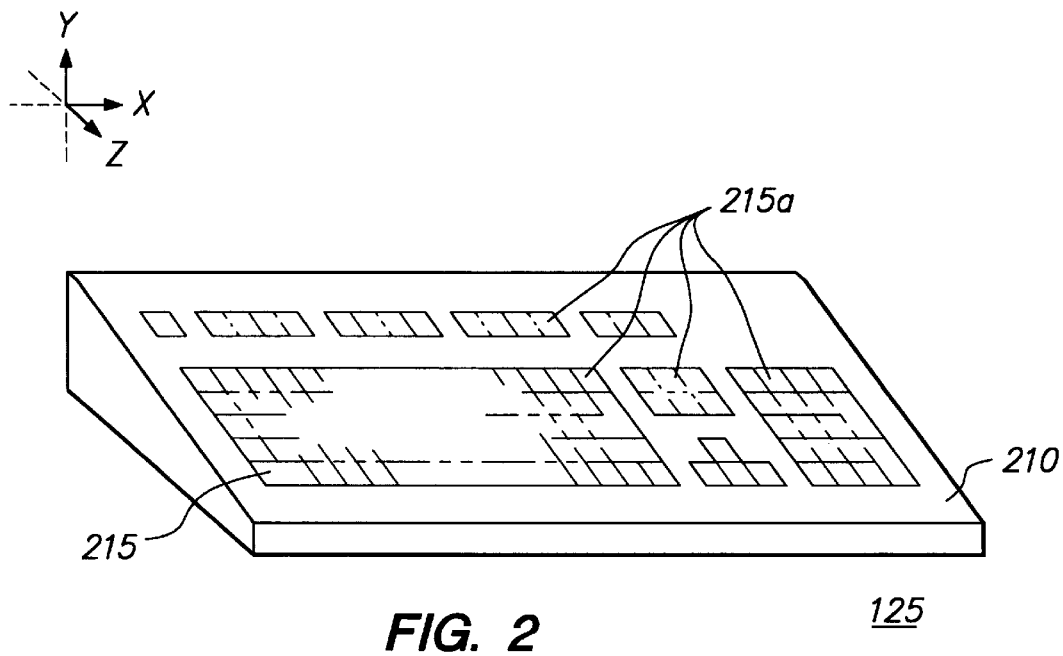
FIG. 2 is a diagram illustrating a computer keyboard in accordance with the present invention.

FIG. 2 is an external diagram of one embodiment of the wireless keyboard 125 in accordance with the present invention. The wireless keyboard 125 having a housing 210 and a keycap subsystem 215 that includes one or more keycaps 215a. The housing 210 may be composed of a plastic, for example an injection molded thermoplastic or other similar material. Further, the keycaps 215a may also be composed of a thermoplastic material.

It is noted that the keyboard function of the wireless keyboard 125 may be functionally and structurally similar to a commercially available keyboard such as a 101-key keyboard from IBM Corporation of Armonk, N.Y., a wave keyboard from Microsoft Corporation, of Redmond, Wash., or a membrane-type keyboard, for example. In addition, the dimensions of the wireless keyboard 125 may be approximately 46 centimeters by 18 centimeters by 3 centimeters, for example.

Figure 3B:
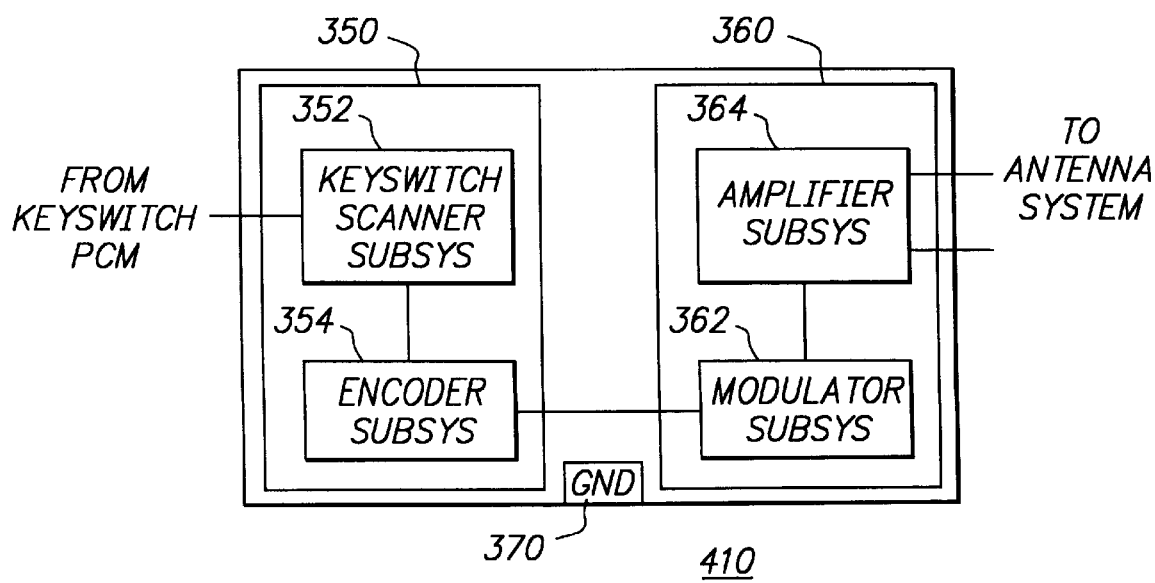
FIG. 3b is a block diagram of an RF transmitter printed circuit board ("RF transmitter PCB") 410 in accordance with the present invention.
Figure 3A:
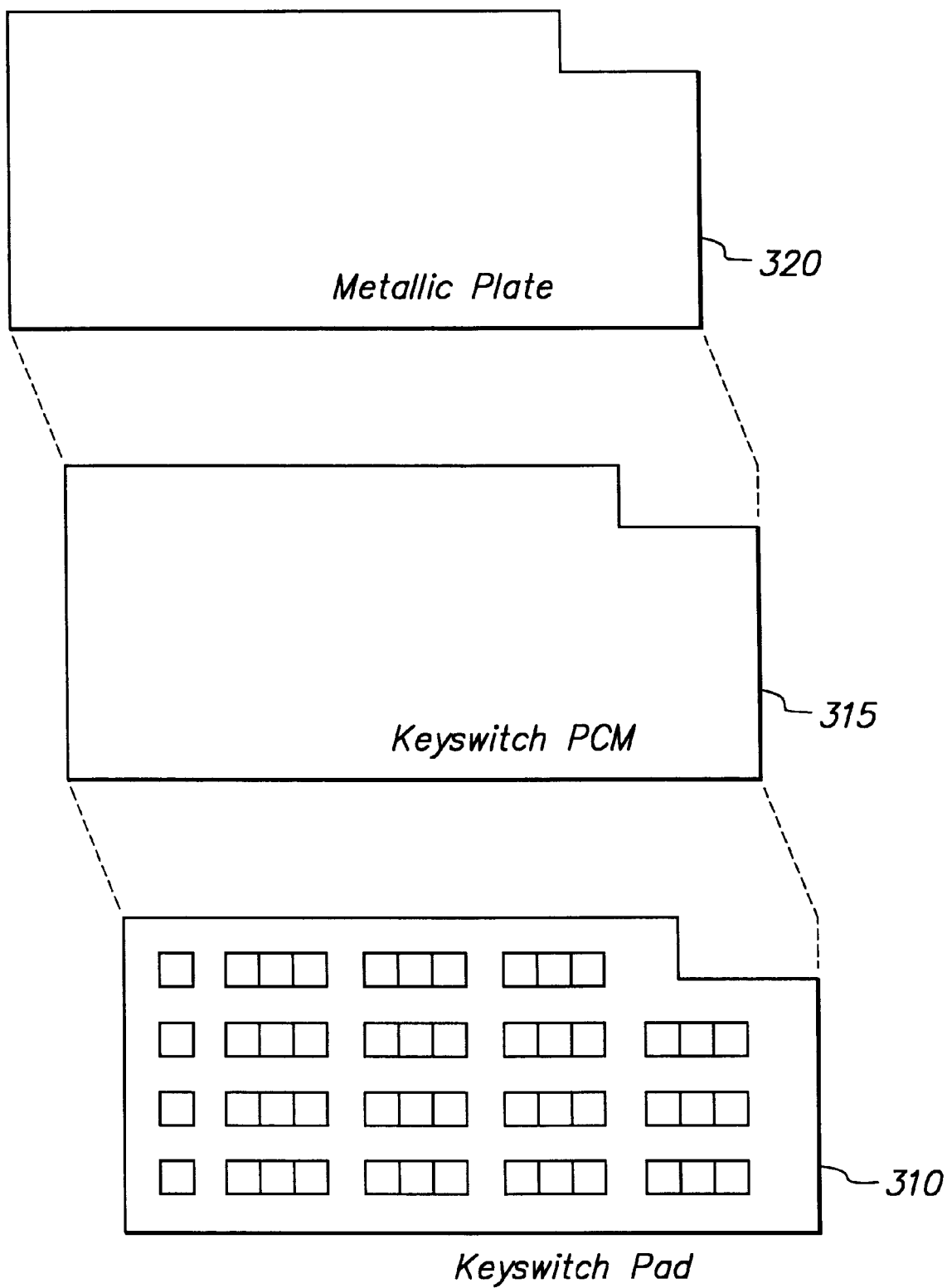
FIG. 3a is a diagram illustrating an internal structure of a wireless keyboard in accordance with the present invention.

FIG. 3a is a diagram of internal structural components of a keyswitch system 301 of the wireless keyboard 125. The keyswitch system 301 includes a keyswitch pad 310, a keyswitch printed circuit membrane ("keyswitch PCM") subsystem 315 that includes one or more keyswitch printed circuit membranes, and a metallic plate 320. The keyswitch pad includes keyswitches 325 that are membrane keyswitches or mechanical keyswitches, for example. It is noted that in an alternative embodiment, the keyswitch PCM subsystem 315 maybe substituted with a keyswitch printed circuit board ("keyswitch PCB"). Further, the keyswitch PCB may be constructed to incorporate the metallic plate 320, for example as a thin copper film.

The keyswitch pad 310 and the keyswitch PCM subsystem 315 may be comprised of a lightweight flexible plastic or other similar material. The metallic plate 320 may be comprised of a metallic material that may be flexible or substantially rigid and may have dimensions of 40 centimeters by 15 centimeters, for example. The keyswitches 325 are membrane keyswitches or mechanical keyswitches, for example. Each keyswitch 325a is associated with a particular keycap 215a that is, in turn, associated with a particular character or function on the wireless keyboard 125.

The keyswitch pad 310 is coupled to the keyswitch PCM subsystem 315. The combination of the keyswitch pad 310 and keyswitch PCM subsystem 315 is coupled to the metallic plate, which provides structural rigidity for the keyswitch system 101 of the wireless keyboard 125. The metallic plate 320 also protects the keyswitch PCM subsystem 315 against electrostatic discharge.

In addition, the keyswitch PCM subsystem 315 includes a series of electrical contacts. Each electrical contact is in an open position until closed by a particular keyswitch 325a. A keyswitch 325a closes the electrical contact when the associated keycap 215a is depressed by a user. As further described below, the RF wireless keyboard 125 transmits an RF signal representing the character or function associated with the particular keycap 215a and keyswitch 325a to the RF receiver subsystem 120.

FIG. 3b is a block diagram of an RF transmitter printed circuit board ("RF transmitter PCB") 410, or alternatively an RF transmitter printed circuit membrane ("RF transmitter PCM"), in accordance with the present invention. The RF transmitter PCB 410 generates RF signals for transmission to the receiver subsystem 120. The RF transmitter PCB 410 includes a digital processing circuit 350 and a low-power RF transmitter circuit 360 having two output terminals. In one embodiment, one output terminal is an electrical ground 370 of the transmitter PCB 410. The digital processing circuit 350 is coupled to the RF transmitter circuit 360.

The digital processing circuit 350 includes a keyswitch scanner subsystem 352 and a keyswitch encoder subsystem 354. The RF transmitter circuit 360 includes a modulator subsystem 362 and may also include an amplifier subsystem 364. The scanner subsystem 352 is coupled to the keyswitch PCM subsystem 315 and the keyswitch encoder subsystem 354. The keyswitch encoder subsystem 354 is coupled to the modulator subsystem 362. The modulator subsystem 362 is coupled to the amplifier subsystem 364. The RF transmitter circuit 360 is coupled to an RF antenna system in accordance with the present invention.

In one embodiment, during operation of the wireless keyboard 125 the scanner subsystem 352 scans the keyswitch PCM subsystem 315 to detect a closed electrical contact as a result of a depressed keycap 215a. Once detected, the keyswitch encoder subsystem 354 generates an encoded data signal associated with a character or function of the depressed keycap 215a. The encoded data signal is modulated by the modulator subsystem 362 so that it may be transmitted as an RF signal. The RF signal may also be amplified by the amplifier subsystem 364 before transmission by the RF antenna system. It is noted that the RF transmitter PCB 410, as well as other electrical systems within the RF wireless keyboard 125, may be powered by a battery supply such as two 1.5 volt alkaline or nickel-cadmium batteries, for example.

Figure 4A:
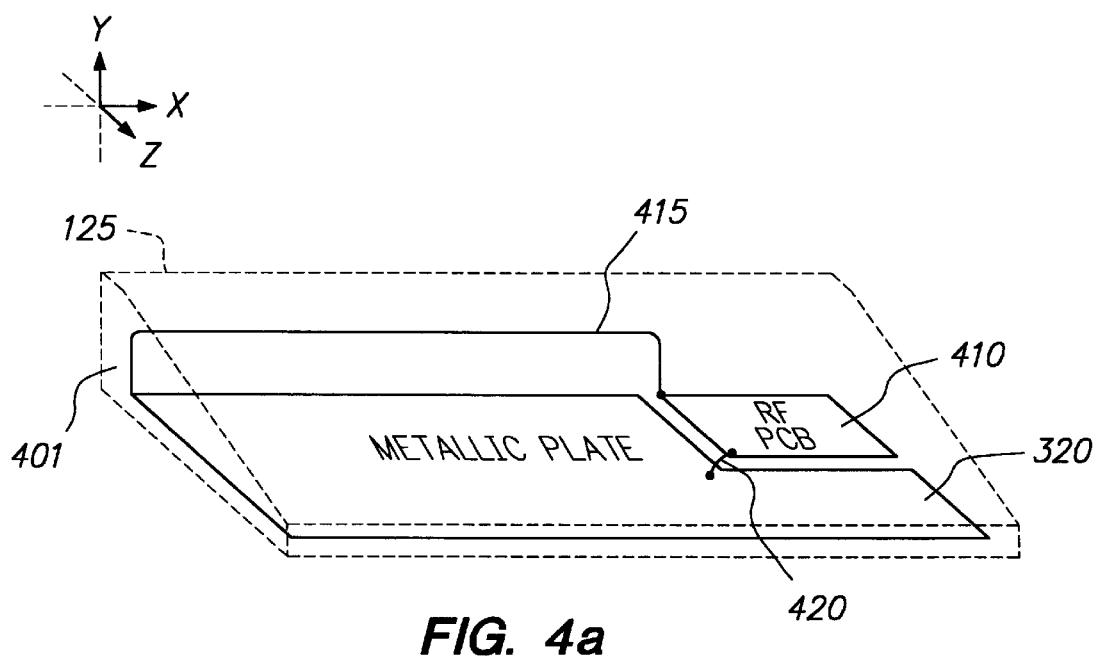
FIGS. 4a, 4b, and 4c are diagrams illustrating one embodiment a radio frequency antenna system within the housing of a wireless keyboard in accordance with the present invention.
Figure 4B:
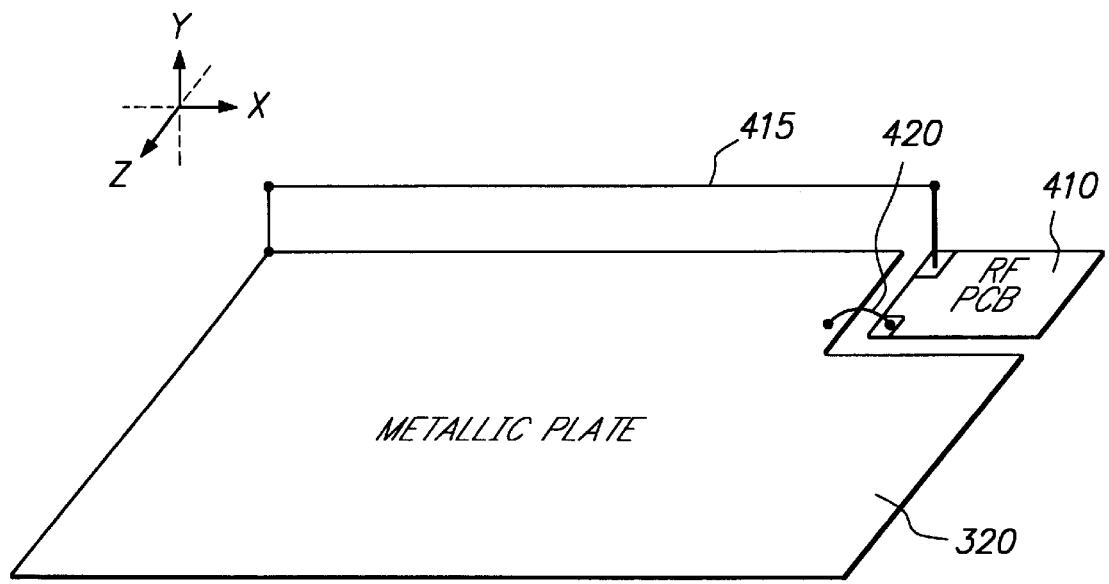

FIG. 4a is a diagram of one embodiment of an RF antenna system 401 within the wireless keyboard 125 in accordance with the present invention. FIG. 4b is a standalone diagram of an RF antenna system 401 in accordance with the present invention. The RF antenna system 401 includes the metallic plate 320, an antenna wire 415, and a connector wire 420. The RF antenna system 401 may include the RF transmitter PCB 410.

The antenna wire 415 is coupled at a first end to an output of the amplifier subsystem 364 of the RF transmitter PCB 410 and is coupled at a second end to a first end or section of the metallic plate 320. A second end or section of the metallic plate 320 is coupled, through the connector wire 420, to a second output of the amplifier subsystem 364, which may be the ground 370 of the RF transmitter PCB 410.

The antenna wire 415 and the metallic plate 320 form an antenna loop that is coupled to the outputs of the amplifier subsystem 364. The length of the antenna loop may be approximately equivalent to the length of the wireless keyboard 125 and the width of the antenna loop may be as large as the remaining free space (height, length, and/or width) within the wireless keyboard 125. For example, the antenna loop may have a length of 40 centimeters and a width of 2 centimeters. In alternative embodiments the length and/or the width of the antenna loop may be enlarged or shortened.

The antenna loop of the antenna system 401 generates a magnetic field from which the RF signals from the RF transmitter circuit 360 are transmitted to the receiver subsystem 120 in accordance with electromagnetic propagation principles. The space between the antenna wire 415 and the metallic plate 320 provides a large antenna loop surface for transmitting the RF signals.

Figure 4C:
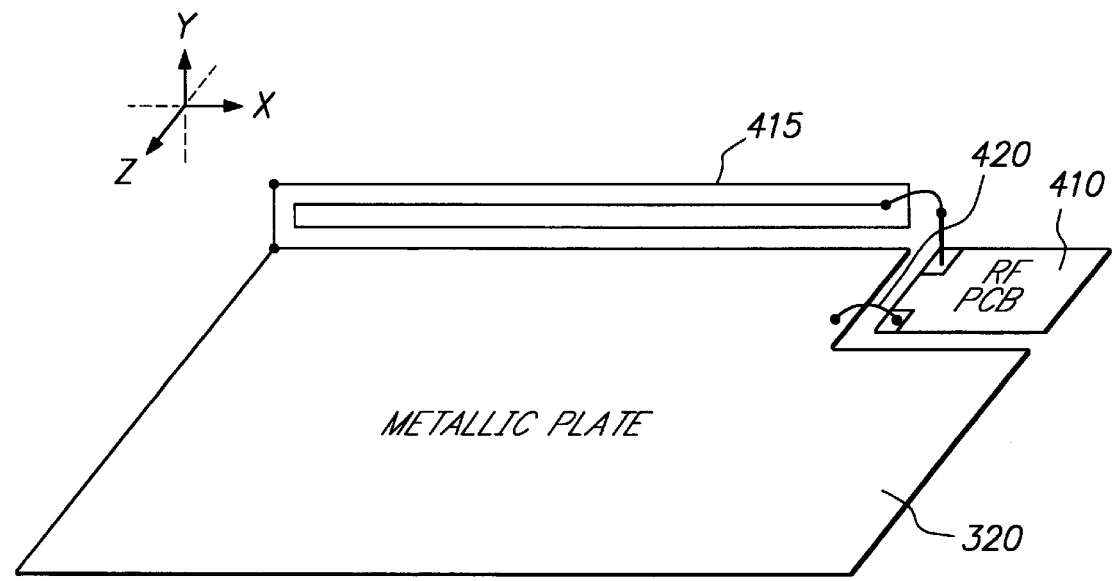
Figure 5A:
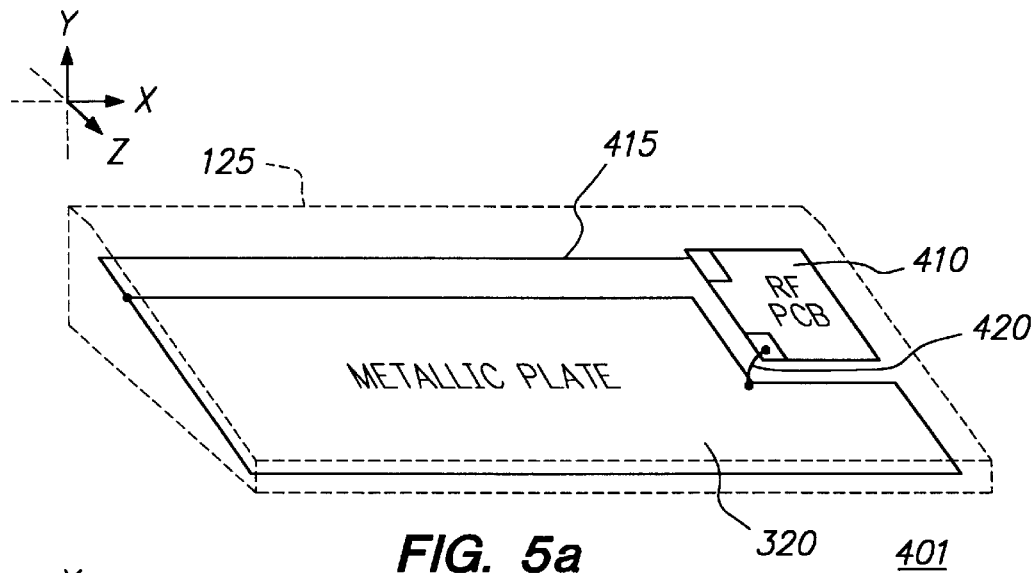
FIGS. 5a, 5b, and 5c are diagrams illustrating alternative embodiments of a radio frequency antenna system within the housing of the wireless keyboard in accordance with the present invention.
Figure 5B:
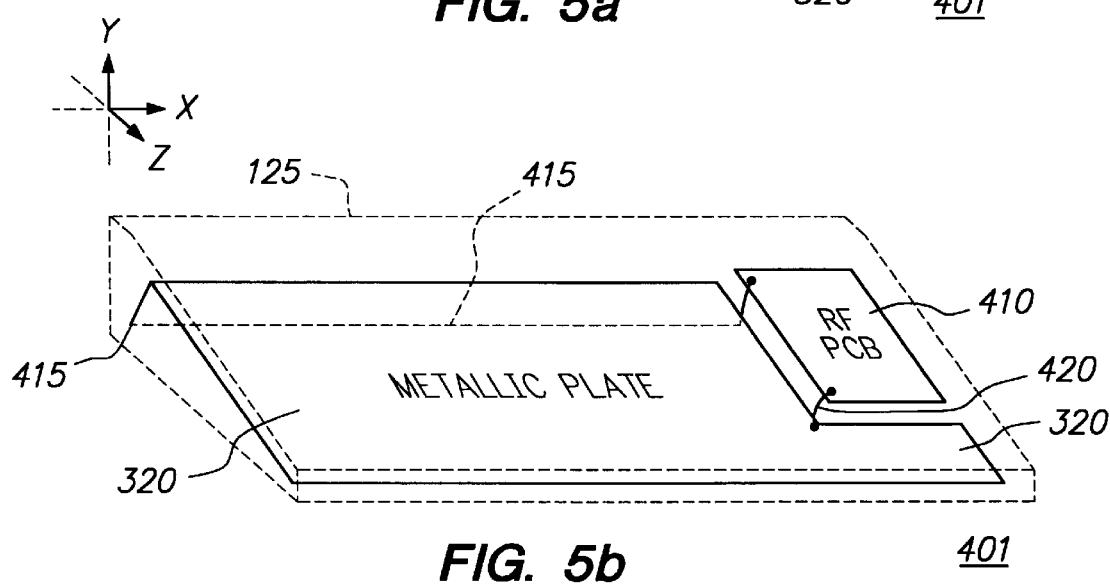
Figure 5C:
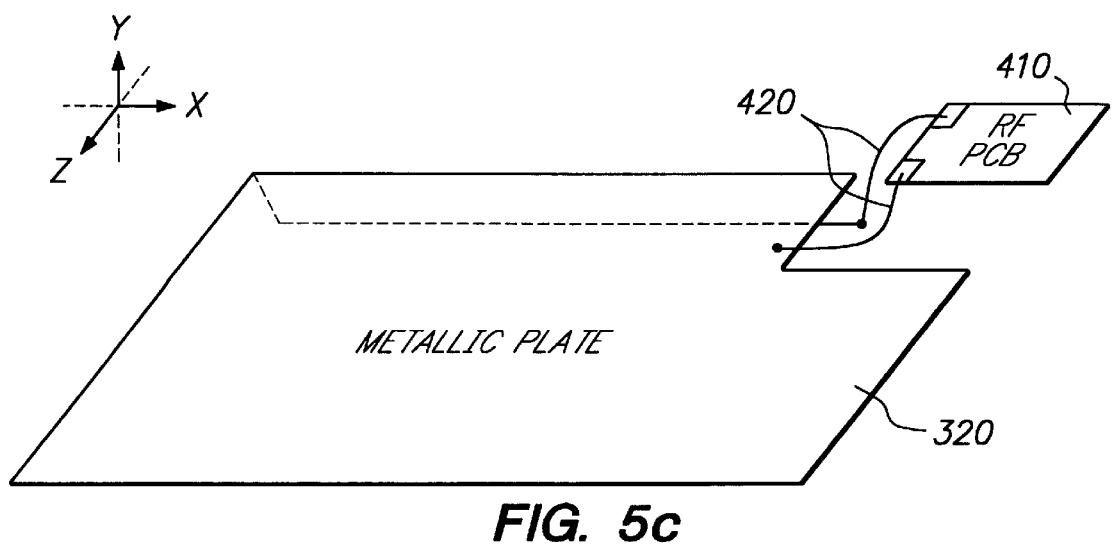

It is noted that in one embodiment of the present invention, the RF antenna system 401 includes an antenna wire 415 having one turn. In an alternative embodiment of the present invention, the antenna wire 415 may have more than one turn. For example, FIG. 4c illustrates an antenna loop having an antenna wire 415 with two turns. The additional turns of the antenna wire 415 expands the surface area of the antenna loop to increase the transmission range of the RF antenna system 401. Further, it is noted that in alternative embodiments of the present invention the antenna loop may lie in the same geometric plane as the metallic plate 320 as shown in FIG. 5a or in any other plane, for example, as shown in FIGS. 5b and 5c.

Figure 6A:
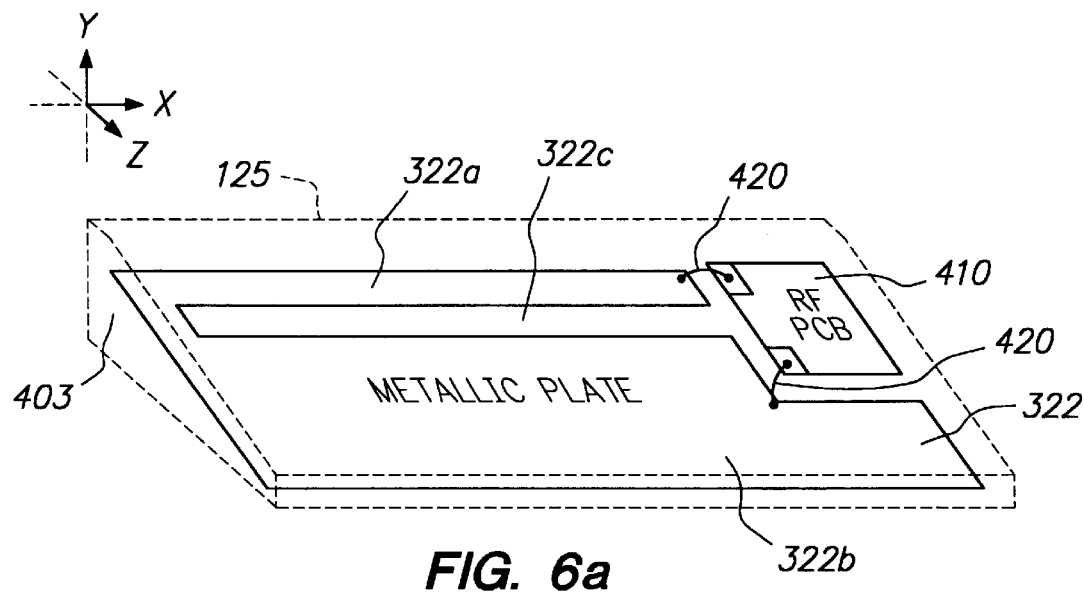
FIGS. 6a, 6b, and 6c are diagrams illustrating a second embodiment of a radio frequency antenna system within the housing of a wireless keyboard in accordance with the present invention.
Figure 6B:
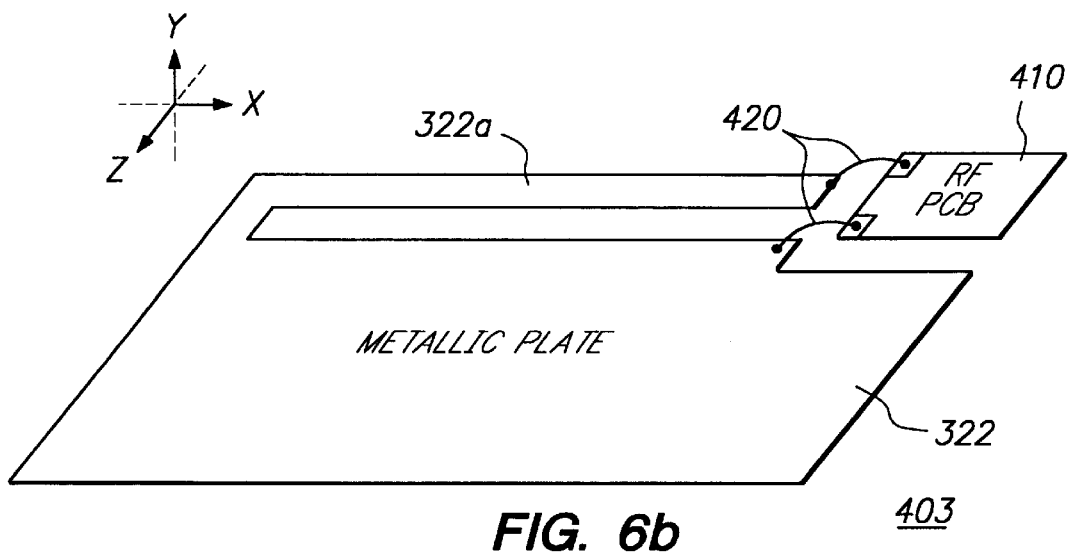

FIG. 6a is a diagram of a second embodiment of an RF antenna system 403 within the RF wireless keyboard 125 in accordance with the present invention. FIG. 6b is a standalone diagram of the second embodiment of the RF antenna system 403 in accordance with the present invention. It is noted that the antenna system 403 is functionally equivalent to the antenna system 401.

The RF antenna system 403 includes a second embodiment of a metallic plate 322 having a first antenna portion 322a and a second antenna portion 322b, the RF transmitter PCB 410, and the connection wires 420. The RF antenna system 403 may also include the RF transmitter PCB 410. It is noted that the second embodiment of the metallic plate 322 is functionally and structurally similar to the metallic plate 320 described above.

The first antenna portion 322a and the second antenna portion 322b are from the same metallic plate 322 and form a cut out space 322c in-between. One output of the amplifier subsystem 364 of the RF transmitter circuit 360 is coupled via a connection wire 420 to the first antenna portion 322a. The second output of the amplifier subsystem 364 of the RF transmitter circuit 360, which may be the ground 370 of the RF transmitter PCB 410, is coupled to the second antenna portion 322b.

An antenna loop is formed by the first antenna portion 322 and the second antenna portion 322b of the metallic plate 322. Once again, the length of the antenna loop may be approximately equivalent to the length of the wireless keyboard 125 and the width of the antenna loop may be as large as the remaining free space (height, length, and/or width) within the wireless keyboard 125. The antenna loop may lie in any plane as described above with respect to FIGS. 5a, 5b, and 5c.

Figure 6C:
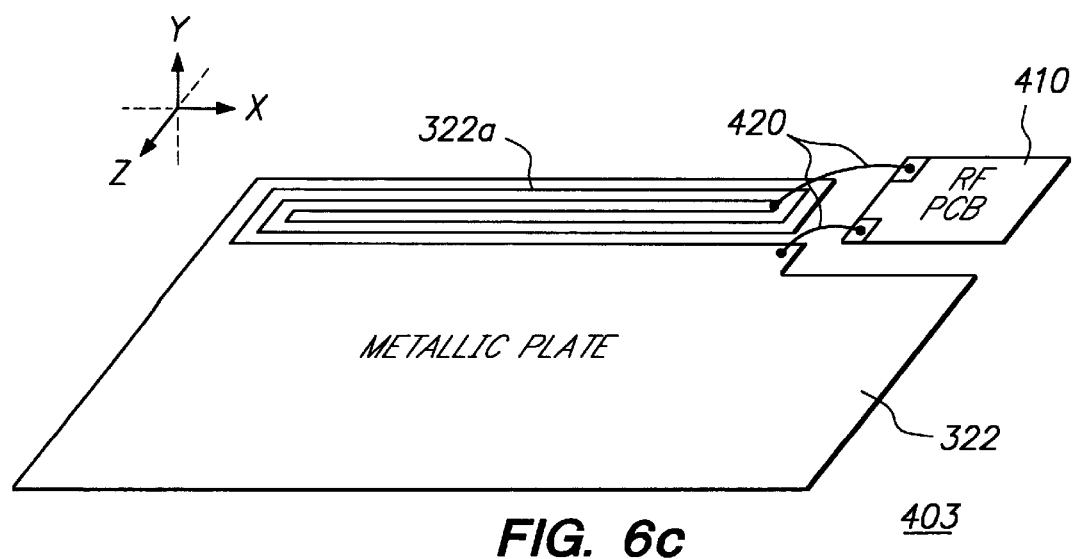

The cut-out space 322c between the first antenna portion 322a and the second antenna portion 322c provides for a large antenna loop surface for transmitting RF signals. Further, the metallic plate may be cut out to include more than two antenna portions to form a cut-out space having two or more turns as illustrated in FIG. 6c. As described above with respect to FIG. 4c, the additional turns expand the surface area of the antenna loop to increase the transmission range of the antenna system 403. Once again, the RF signals that are transmitted by the antenna loop may be received by the receiver subsystem 120.

Figure 7A:
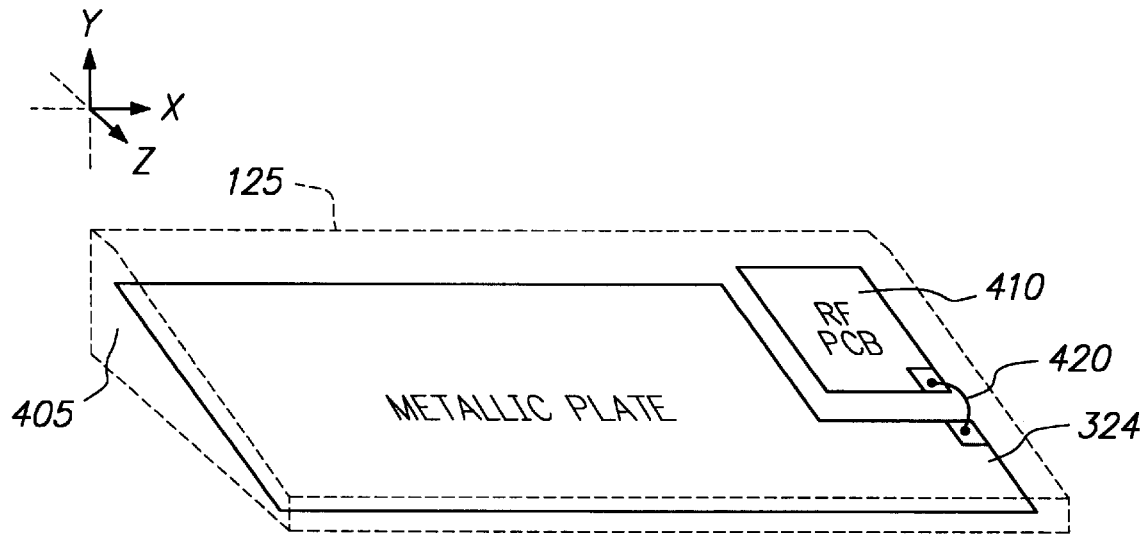
FIGS. 7a and 7b are diagrams illustrating a third embodiment of a radio frequency antenna system within a housing a wireless keyboard in accordance with the present invention.
Figure 7B:
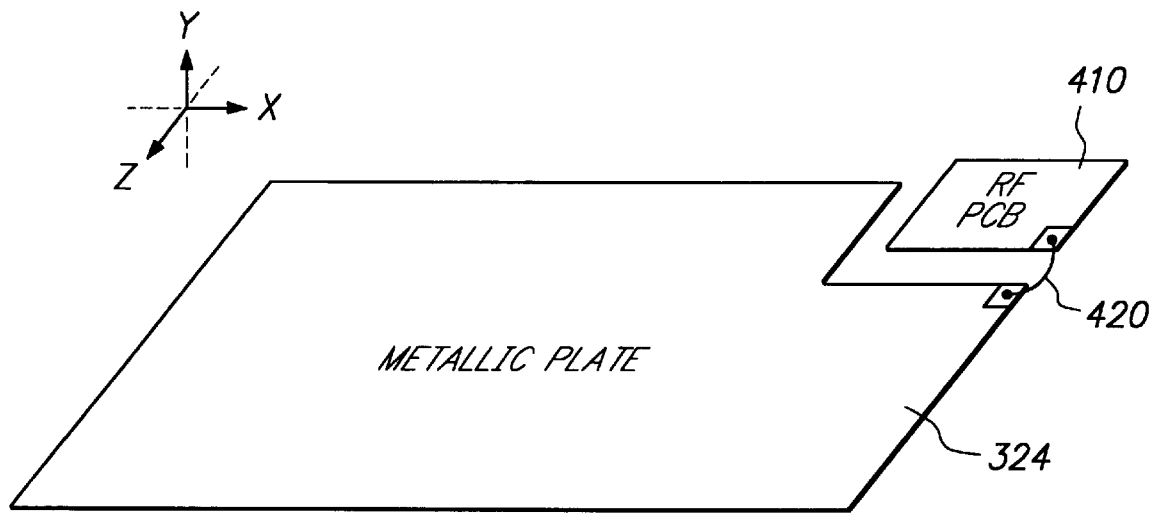

FIG. 7a is a diagram of a third embodiment of an RF antenna system 405 within the RF wireless keyboard 125 in accordance with the present invention. FIG. 7b is a standalone diagram of the third embodiment of the RF antenna system 405. It is noted that the antenna system 405 is similar to the antenna system 401 such that a large order antenna size is not required to transmit RF signals from the RF transmitter circuit 360 of the wireless keyboard 125.

The antenna system 405 includes a third embodiment of a metallic plate 324, the RF transmitter PCB 410, and the connection wire 420. It is noted that the third embodiment of the metallic plate 324 is similar to the metallic plate 320 with respect to, for example, serving as part of the antenna system while preventing electrostatic discharge and providing structural rigidity. The output of the amplifier subsystem 364 of the RF transmitter circuit 360 is coupled through the connection wire 420 directly to the metallic plate 324. There is no ground connection between the metallic plate 324 and the RF transmitter PCB 410.

The antenna system 405 includes the metallic plate 324 that operates as a whip or dipole antenna. The whip antenna of the antenna system 405 generates an electric field from which RF signals are transmitted to the receiver subsystem 120 in accordance with electromagnetic propagation principles.

During operation of the wireless keyboard 125, when a keycap 215a is depressed, an amplified RF signal is generated from the RF transmitter PCB that represents the character or function associated with the depressed keycap 215a as described above with respect to FIG. 3b. The RF signal is output from the amplifier subsystem 364 along the antenna loop (current flow) or whip (voltage differential) of the antenna system 401, 402, 403 for transmission from the RF wireless keyboard 125. The RF signal that is transmitted through the antenna system 401, 403, 405 may be received by the receiver subsystem 120 for processing the RF signal.

In one embodiment of the present invention the antenna system 401, 403, 405 is tuned to transmit the RF signals at a frequency of 27 MHz, although it may also be tuned to transmit at other functionally equivalent frequencies. Transmitting RF signals at a frequency of 27 MHz generates a wavelength of approximately eleven meters. While conventional RF antennas are three to six meters in size to transmit such RF signal, the present invention is advantageously compact to fit within the wireless keyboard 125 without performance loss or degradation.

The antenna system 401, 403, 405 of the present invention beneficially uses the metallic plate 320, 322, 324 present in a wireless keyboard as a part of a RF antenna system for RF communication with the receiver subsystem 120. Integrating the metallic plate 320, 322, 324 provides efficiencies for transmission of RF signals as existing keyboard components are used for the antenna system 401, 403, 405. Further, using the metallic plate 320, 322, 324 as a part of the antenna system 401, 403, 405 prevents transmission of distorted RF data signals resulting from excessive attenuation or interference because of the presence of the metallic plate 320, 322, 324 in the keyboard. It is noted that the metallic plate 320, 322, 324 may be of different geometric shapes and have various configurations without departing from the spirit of the invention.

The present invention also increases antenna efficiency by providing good radiation characteristics in both horizontal polarization and vertical polarization. Thus, the quality of the RF signal link between the wireless keyboard 125 and the receiver subsystem 120 remains a good quality link even if the RF transmitter circuit 360 or the receiver subsystem 120 are not flat on a table. Another advantage of the antenna system 401, 403, 405 is that the receiver subsystem 120 does not require a customized configuration and can simply be integrated within a desktop or tower personal computer. In addition to begin efficient, the antenna system 401, 403, 405 is also compact so that it can fit within the keyboard housing 210 of the wireless keyboard 125.

The antenna system 401, 403, 405 of the present invention also provides a benefit of using the low-power RF transmitter subsystem 364 for transmission of RF signals. Specifically, power consumption is reduced so that battery-life is increased in the wireless keyboard 125. For example, the antenna system 401, 403, 405 allows for the use of a 3.0 volt power supply, e.g., two 1.5-volt batteries, that last longer than a 6.0 volt or larger power supplies in conventional wireless keyboards.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a data processing system including a computer coupled with a radio frequency receiver and a wireless keyboard having a radio frequency transmitter, a radio frequency antenna system for communicatively coupling the radio frequency transmitter and the radio frequency receiver, the radio frequency antenna system comprising:

a metallic plate, having a first side and a second side, coupled within the wireless keyboard; and an antenna wire, having a first end and a second end, the first end of the antenna wire and the first side of the metallic plate coupled to the radio frequency transmitter and the second end of the antenna wire coupled to the second side of the metallic plate, the antenna wire and the metallic plate forming a closed antenna loop for transmitting a radio frequency signal from the radio frequency transmitter.

2. The radio frequency antenna system in claim 1, wherein the antenna wire includes at least one turn.

3. The radio frequency antenna system in claim 1, wherein the antenna loop generates a magnetic field for transmitting the radio frequency signal.

4. The radio frequency antenna system in claim 1, wherein the radio frequency signal is transmitted by the antenna system at substantially 27 MHz.

5. The radio frequency antenna system in claim 1, wherein the metallic plate comprises a plurality of metallic plates.

6. In a wireless keyboard, an antenna system comprising:

a metallic plate, having a first side and a second side;

a transmitter having a first connection and a second connection, the second connection of the transmitter coupled to the second side of the metallic plate, the transmitter for generating a communication signal; and an antenna wire, having a first end and a second end, the first end coupled to the first side of the metallic plate and the second end coupled to the first connection of the transmitter for transmitting the communication signal, wherein the metallic plate and the antenna wire comprise a closed antenna loop to transmit the generated communication signal.

7. The antenna system in claim 6, wherein the antenna wire includes at least one turn.

8. The antenna system in claim 6, wherein the antenna loop comprises a length of substantially 40 centimeters.

9. The antenna system in claim 8, wherein the transmitter is a radio frequency transmitter that transmits a radio frequency signal at substantially 27 MHz.

10. The antenna system in claim 6, wherein the metallic plate comprises a plurality of metallic plates.

11. In a wireless radio frequency keyboard, a radio frequency antenna system comprising:

a radio frequency transmitter having a first electrical connection and a second electrical connection, for generating a radio frequency signal; and a metallic plate including a first portion and a second portion, the first portion and the second portion having a cut out space in-between for forming a closed antenna loop, the first portion of the metallic plate coupled to the first electrical connection of the radio frequency transmitter and the second portion of the metallic plate coupled to the second electrical connection of the radio frequency transmitter, the antenna loop for transmitting the radio frequency signal.

12. The radio frequency antenna system in claim 11, wherein the metallic plate includes a third portion between the first portion and the second portion, the space between the first portion and the third portion forming a first cut-out space and the space between the third portion and the second portion forming a second cut-out space, the first portion, the second portion, and the third portion, forming at least one turn for the antenna loop.

13. The radio frequency antenna system in claim 11, wherein the antenna loop generates a magnetic field for transmitting the radio frequency signal.

14. The radio frequency antenna system in claim 11, wherein the metallic plate is substantially dimensioned to an area of the wireless radio frequency keyboard base.

15. The radio frequency antenna system in claim 14, wherein the radio frequency transmitter transmits a radio frequency signal at substantially 27 MHz.

16. In a wireless keyboard having a plurality of keyswitches and an antenna system comprising:

a transmitter, having a first electrical connection and a second electrical connection for generating a communication signal corresponding to a particular keyswitch on the wireless keyboard; and a metallic plate, having a first side and a second side, the first side coupled to the first electrical connection and the second side coupled to the second electrical connection of the transmitter for transmitting the communication signal, wherein the metallic plate comprises a closed antenna loop dimensioned from a cut-out space in the metallic plate.

17. The antenna system in claim 16, wherein the metallic plate generates a magnetic field for transmitting the communication signal.

18. The antenna system in claim 16, wherein the transmitter is a radio frequency transmitter that transmits the communication signal at substantially 27 MHz.

19. The antenna system in claim 16, wherein the antenna loop is substantially dimensioned to a perimeter of a base of the wireless keyboard.

20. The antenna system in claim 16, wherein the metallic plate comprises a plurality of metallic plates.

* * * * *